United States Patent
Poornachandran et al.

(10) Patent No.: US 10,158,671 B2
(45) Date of Patent: Dec. 18, 2018

(54) REVERSE DRM GEO-FENCING OF UAV METHOD AND APPARATUS

(71) Applicant: Intel Corporation, Santa Clara, CA (US)

(72) Inventors: Rajesh Poornachandran, Portland, OR (US); Ned M. Smith, Beaverton, OR (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 15/063,210

(22) Filed: Mar. 7, 2016

(65) Prior Publication Data

US 2017/0255194 A1  Sep. 7, 2017

(51) Int. Cl.
| | |
|---|---|
| H04L 29/06 | (2006.01) |
| B64C 39/02 | (2006.01) |
| G07C 5/00 | (2006.01) |
| H04W 12/06 | (2009.01) |
| H04W 4/021 | (2018.01) |
| G06F 21/10 | (2013.01) |
| G05D 1/00 | (2006.01) |
| G08G 5/00 | (2006.01) |
| H04W 12/08 | (2009.01) |

(52) U.S. Cl.
CPC .......... *H04L 63/20* (2013.01); *B64C 39/024* (2013.01); *G05D 1/0022* (2013.01); *G06F 21/10* (2013.01); *G07C 5/008* (2013.01); *G08G 5/006* (2013.01); *G08G 5/0013* (2013.01); *G08G 5/0069* (2013.01); *G08G 5/0086* (2013.01); *H04L 63/08* (2013.01); *H04L 63/102* (2013.01); *H04W 4/021* (2013.01); *H04W 12/06* (2013.01); *H04W 12/08* (2013.01); *B64C 2201/141* (2013.01)

(58) Field of Classification Search
None
See application file for complete search history.

(56) References Cited

U.S. PATENT DOCUMENTS

| | | | | |
|---|---|---|---|---|
| 9,805,372 | B2 * | 10/2017 | Gong | H04L 63/101 |
| 2016/0288905 | A1 * | 10/2016 | Gong | H04L 63/101 |
| 2017/0178072 | A1 * | 6/2017 | Poornachandran | G06Q 10/0833 |
| 2017/0244565 | A1 * | 8/2017 | Bronk | H04L 63/126 |
| 2017/0285633 | A1 * | 10/2017 | Poornachandran | G05D 1/0022 |

* cited by examiner

*Primary Examiner* — Thomas G Black
*Assistant Examiner* — Ana D Thomas
(74) *Attorney, Agent, or Firm* — Schwabe, Williamson & Wyatt, P.C.

(57) ABSTRACT

Apparatuses, methods and storage medium associated with reverse DRM geo-fencing are disclosed. In embodiments, an UAV may comprise sensors to provide sensor data for aerial operation over or near a geographic area, and collect sensor data of a target within the geographic area, and a reverse DRM geo-fence policy enforcement manager to enforce reverse DRM geo-fence policies on operation of the sensors while the UAV operates over/near the geographic area. In other embodiments, a base station may include a reverse DRM geo-fence policy generator to instruct an UAV to enforce reverse DRM geo-fence policies on operation of sensors of the UAV on collecting sensor data of the target within the geographic area while the UAV operates over or near the geographic area. Other embodiments may be disclosed or claimed.

24 Claims, 6 Drawing Sheets

REVERSE DRM GEO-FENCING OF UAV METHOD AND APPARATUS

TECHNICAL FIELD

The present disclosure relates to the fields of unmanned aerial vehicles (UAV) and digital rights management (DRM). In particular, the present disclosure is related to method and apparatus for secure reverse DRM geo-fencing of UAV (also referred to as "drone").

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

The civilian drone market is projected to surpass $1B in 2016 and may exceed $3.5B by 2024 (Business Insider). Increased use of drones by hobbyists has resulted in complaints from concerned citizens who increasingly are concerned with privacy consequences of areal/mobile camera platforms that drones provide. Not surprisingly, many city and county governments have begun to require drone operator registration programs and to create new laws aimed at controlling drone operators who fly their drones near populated areas and in airspace some feel should be off limits. For example, municipal airports are within range of a drone flying from a person's home or other private property. Still others are concerned that drone operation near industrial areas could pose a threat to safe operation of a manufacturing enterprise.

With increasing concern over drone operation in areas previously outside of Federal Aviation Administration (FAA) oversight because of the inappropriateness and infeasibility of commercial aircraft operation in residential and industrial areas, there is a need to define conventions for drone operation for non-commercial and commercial use in populated areas. Innovation can often create a set of options and capabilities that better addresses citizen concerns than the alternative of using regulation.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
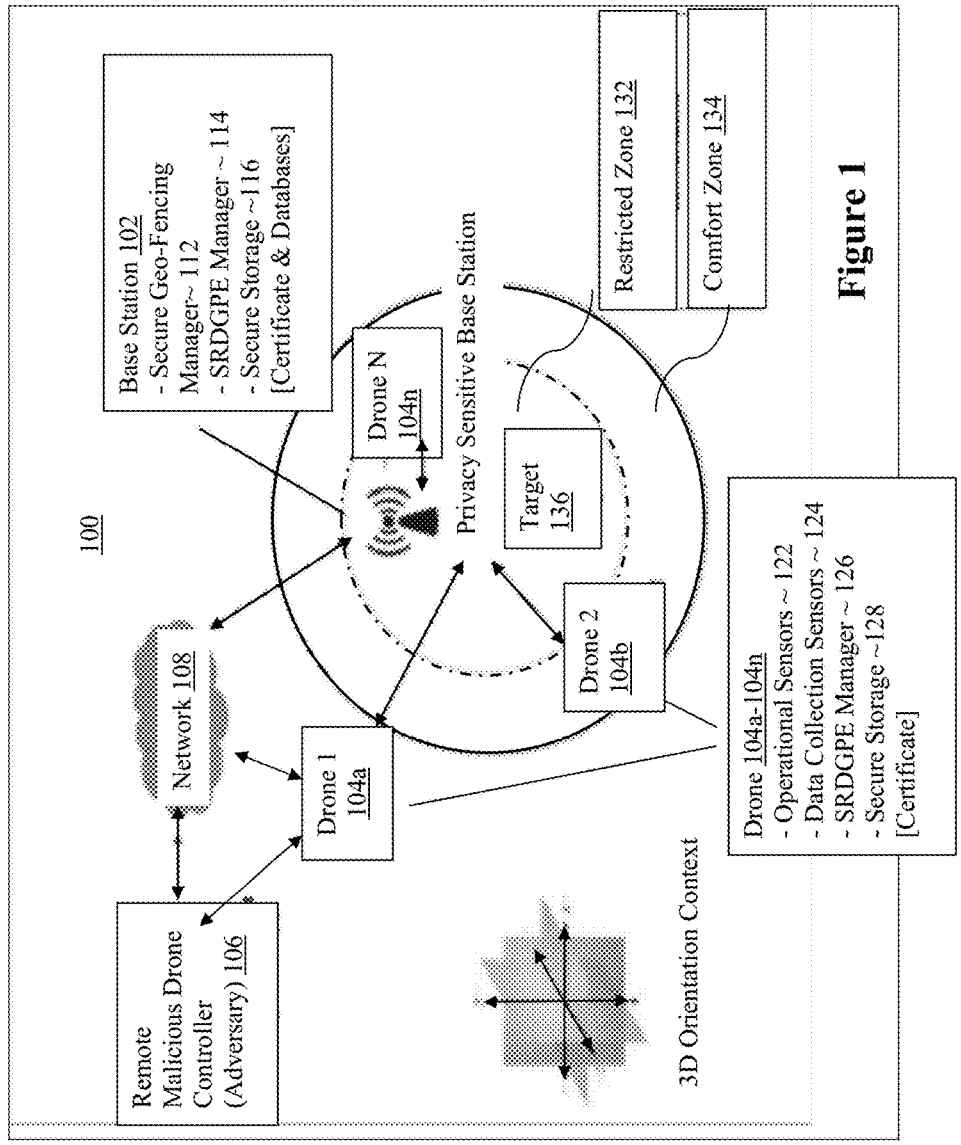
FIG. 1 illustrates an overview of a base station (BS) practicing secure reverse DRM geo-fencing of UAVs over a privacy sensitive geographic area, in accordance with various embodiments.

Today, some of the technical gaps that may exist in the area of drone hosted content creation include, but are not limited, the following:

Currently there is no secure policy enforcement mechanism to control sensors on one or more drones for a specific geo-fenced area.

As drones can roam across various zones for a given geo-fenced area, there is a strong desire on behalf of citizen's seeking privacy protection to assert policies that drone operators must abide by to control drone-hosted onboard sensors so that content captured doesn't diminish the affected party's privacy rights.

Most governmental agencies charged with managing shared resource of airspace have not evolved to a level of sophistication that individual privacy interests can be meaningfully represented and enforced by public agencies and police departments.

Drone operators are also seeking solutions that do not make it illegal to operate drones as a result of a few unscrupulous drone operators who violate citizen privacy rights.

The present disclosure described apparatuses, methods and storage medium associated with reverse DRM geo-fencing that address these technical gaps and more. In embodiments, an UAV may comprise first one or more sensors to provide first one or more sensor data for aerial operation over or near a geographic area, and second one or more sensors to collect second one or more sensor data of one or more targets within the geographic area, and a reverse DRM geo-fence policy enforcement manager coupled with the first and second one or more sensors to enforce reverse DRM geo-fence policies on operation of the second one or more sensors while the UAV operates over/near the geographic area. In other embodiments, a base station may include a communication interface including a transmitter and an antenna, and a reverse DRM geo-fence policy generator to instruct an UAV, via the communication interface, to enforce reverse DRM geo-fence policies on operation of sensors of the UAV on collecting sensor data of the one or more targets within the geographic area while the UAV operates over or near the geographic area. These and other embodiments will be described in further detail below with references to FIGS. 1-6.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an overview of a BS practicing secure reverse DRM geo-fencing of UAV over a privacy sensitive geographic area, in accordance with various embodiments, is shown. As illustrated, in environment 100, a BS 102 may be configured with secure geo-fencing manager 112, secure reverse DRM geo-fencing policy enforcement (SRDGPE) manager 114, and secure storage 116, incorporated with the teachings of the present disclosure. Secure geo-fencing manager 112 may be configured to define the location and perimeter of privacy sensitive restricted zone 132, while SRDGPE manager 114 may be configured to enforce reverse DRM policy or policies on collection of data on target(s) 136 within privacy sensitive restricted zone 132 by drones 104a-104n. Additionally, secure geo-fencing manager 112 may be configured to define the location and perimeter of a comfort zone 134 encompassing restricted zone 132, while SRDGPE manager 114 may be configured to begin to authenticate drones 104a-104n, as drones 104a-104n enter comfort zone 134 and heading towards restricted zone 132. Further, SRDGPE manager 114 may be configured to authorize, on authentication, or deny authorization, on failure to authenticate, to drones 104a-104n, to collect data on target(s) 136 within restricted zone 132. SRDGPE manager 114 may also be configured to convey to drones 104a-104n, on authorization, the reverse DRM policy or policies to be enforced by drones 104a-104n on collection of data on target(s) 136 within restricted zone 132, while operating over or near restricted zone 132. Additionally, SRDGPE manager 114 may be configured to ascertain compliance of drones 104a-104n with the reverse DRM policy or policies, including revocation of authorization on determination of non-compliance or failure to enforce the reverse DRM policy or policies.

Secure storage 116 may be configured to store authentication certificate of BS 102 and various operational databases to support the operation of secure geo-fencing manager 112 and SRDGPE manager 114. In embodiments, the operational databases may include, but are not limited to, a transactional database to store transactions (attestations/verifications) with drones 104a-104n, and a revocation database to store denials of permissions to collect data or revocation of granted permissions (e.g., for failure to comply or otherwise enforce the applicable reverse DRM geo-fencing policy/policies).

Each of drones 104* (where 104* may be any one of drones 104a-104n) may be configured with a number of operational sensors 122, data collection sensors 124, SRDGPE manager 126, and secure storage 128, incorporated with the teaching of the present disclosure. The hardware and/or software of the drones 104a-104n may be homogeneous or heterogeneous. Operational sensors 122 may be configured to collect sensor data to operate drone 104* to aviate in environment 100, including over comfort and restricted zones 134 and 132. Data collection sensors 124 may be configured to collect sensor data on targets within environment 100, e.g., target(s) 136 within restricted zone 132. SRDGPE Manager 126 may be configured to authenticate drone 104* with BS 102, receive instructions on reverse DRM policy/policies to be enforced on collection of sensor data on target(s) 136 within restricted zone 132, and determine whether it is able to comply with the instructions and enforce the specified reverse DRM policy/policies. Additionally, SRDGPE Manager 126 may be configured to proceed to enforce the reverse DRM policy/policies, and confirm with BS 102 on the enforcement of the reverse DRM policy/policies, on determination that it is able to comply with the instructions and enforce the specified reverse DRM policy/policies. In embodiments, SRDGPE Manager 126 may be further configured to divert drone 104* to aviate away from restricted zone 132, on determination that it is not able to comply with the instructions and enforce the specified reverse DRM policy/policies. Secure storage 128 may be configured to store an authentication certificate of drone 104* and various operational data to support the operation of SRDGPE manager 126.

Targets 136 within restricted zone 132 may be any person, structure, or object that may be present within restricted zone 132 where a party associated with restricted zone 132, such as an owner or an occupier, wishes to impose certain restrictions on data collection about targets 136 by drones 104a-104n operating over or near restricted zone 132. The reverse DRM geo-fencing policy or policies to impose such restrictions may be any legally permitted restriction, e.g., but not limited to, no optical or infrared photography, no optical or infrared photography in excess of certain resolution, no ultrasonic or audible sonic scanning, or no ultrasonic or audible sonic scanning of certain frequencies.

As alluded to earlier, and will be described more fully below, secure geo-fencing manager 112, secure reverse DRM geo-fencing policy enforcement (SRDGPE) manager 114, and secure storage 116 of BS 102, and SRDGPE Manager 126, and secure storage 128 of each drone 104* are securely implemented, to harden and protect the reverse DRM geo-fencing protocol from tempering, e.g., by remote malicious drone controller 106, which might attack BS 102 and/or drones 104a-104n through network 108 (or directly, in the case of drones 104a-104n). Network 108 may be any combination of private and/or public wired and/or wireless networks known.

Before further describing the reverse DRM geo-fencing protocol, BS 102 and drone 104*, it should be noted that, while for ease of understanding, restricted and comfort zones 132 and 134 are illustrated as two concentric circular areas, the illustration is not meant to be limiting. In embodiments, restricted and comfort zones 132 and 134 may be of any graphical shape. Further, while in general comfort zone 134 encompasses restricted zone 132, zones 132 and 134 may be perfectly concentric as illustrated, or in alternate embodiments, restricted zone 132 may be located off center within comfort zone 134, having larger distances between the perimeters of zones 132 and 134 in some parts of zones 132 and 134, but smaller distances in other parts of zones 132 and 134.

Figure 2:
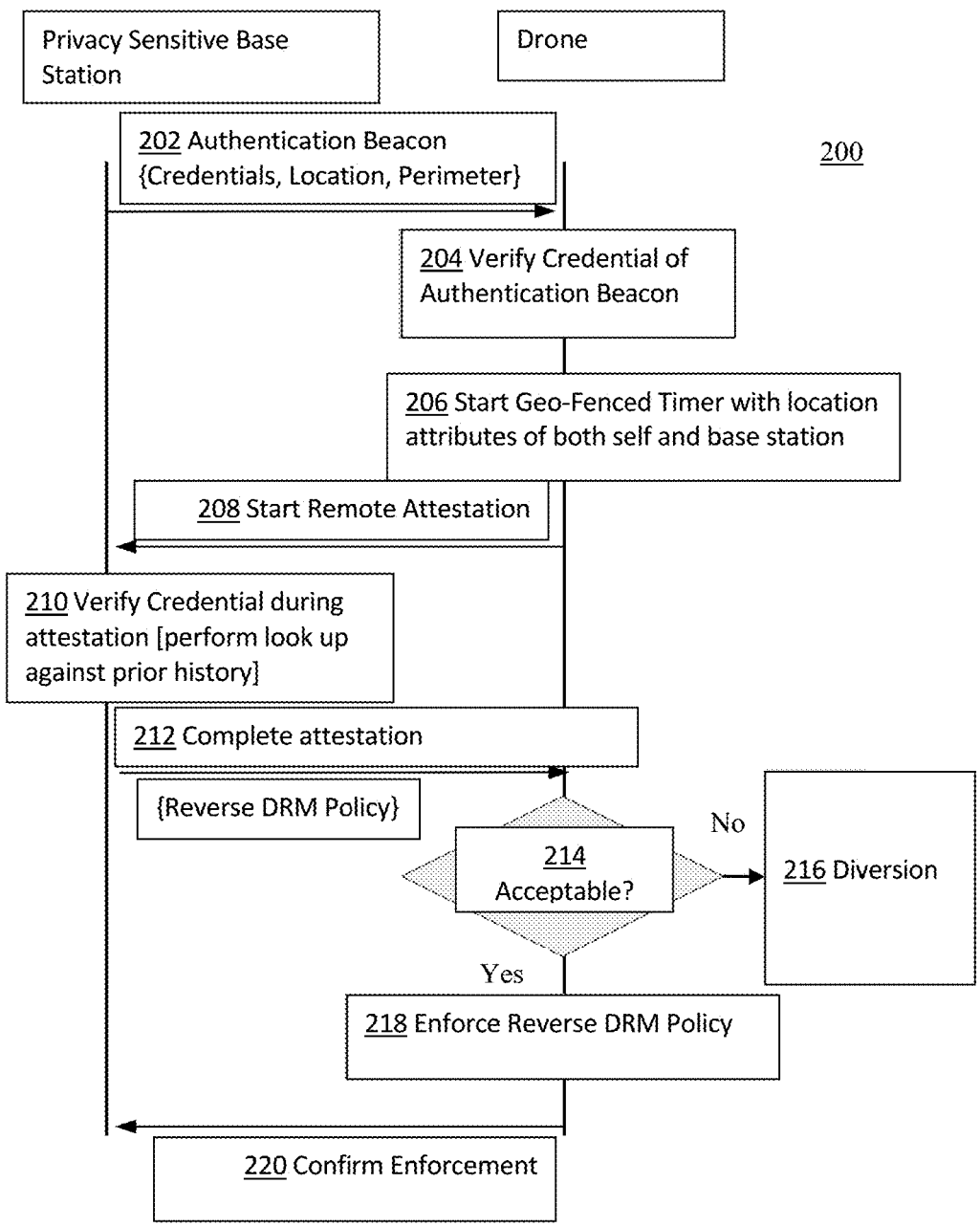
FIG. 2 illustrates a process for reverse DRM geo-fencing of UAV, according to some embodiments.

Referring now to FIG. 2, wherein a process for reverse DRM geo-fencing of UAV, according to some embodiments, is shown. As illustrated, process 200 for reverse DRM geo-fencing of UAV may include operations performed at blocks 202-220. The operations may be performed by e.g., earlier described SRDGPE Managers 114 and 126 of BS 102 and drones 104a-104n.

Process 200 may start at block 202. At block 202, a beacon may be transmitted by a BS assigned to enforce reverse DRM geo-fencing of drones for a privacy sensitive geographical area. The beacon may be transmitted on detection of a drone entering the comfort zone, and heading towards the restricted zone defined for the privacy sensitive geographical area. In embodiments, the beacon may include information on the location and perimeter of the restricted zone. The beacon may also include a certificate of the BS. The certificate may be a certificate issued by a recognized non-governmental or governmental body, e.g., for privacy sensitive geographic areas in the United States, the FAA. Further, the beacon may request the drone to identify itself, including provision of its certificate (issued by the same or similar recognized non-governmental or governmental body).

At block 204, the certificate of the BS may be verified by the beacon receiving drone. At block 206, in response to receipt of the beacon, a geo-fenced timer may be started by the drone. In embodiments, the geo-fenced timer may include the three dimensional (3D) orientation context of the drone, and location attributes of both the drone and the BS. The location attributes of both the drone and the BS, and the timer enable the drone to determine the restricted and comfort zones, and the remaining time available for the drones and the BS to authenticate each other.

Next, at block 208, a secure remote attestation of mutual verification may be initiated by the drone with the BS. At block 210, as part of the remote attestation process, the credential of the drone may be verified by the BS. In embodiments, the secure remote attestation may include the drone providing a certificate of the drone to the BS, and verification of the drone's certificate by the BS. Similarly, as described earlier, the drone's certificate may be a certificate issued by the same or a similar recognized non-governmental or governmental body. In embodiments where the BS (or a cloud server on behalf of the BS) maintains a history of prior denial or revocation of permissions to collect data on targets within its restricted zone, a check may also be performed by the BS against the history to determine whether the drone was ever denied permissions or have granted permission revoked.

Next, at block 212, on verification of the drone's credential, and optionally confirming the drone has not been previously denied permission or have permission revoked, the BS may complete the attestation process, providing an authorization token for data collection to the drone. In embodiments, the authorization token may include restricted DRM geo-fencing policy or policies on data collection on targets within the BS' restricted zone to be complied by the drone, e.g., enforced against the data collection sensors, such as cameras, of the drone. In alternate embodiments where such policies may be recognized and/or maintained by the drone, the authorization token may merely include information identifying the applicable policy/policies, as opposed to actually providing the policy/policies. The drone may be pre-provided with policy/policies or retrieve them from a cloud server.

At block 214, a determination may be performed by the drone on whether it is able to comply with the specified reverse DRM policy/policies, e.g., whether the policy/policies can be enforced on the data collection sensors of the drone. If a result of the determination indicates that the drone is not able to comply or otherwise enforce the specified reverse DRM policy/policies, at block 216, the drone may divert its flight path away from the restricted area indicated by the BS. If a result of the determination indicates that the drone is able to comply or otherwise enforce the specified reverse DRM policy/policies, at block 218, the drone may continue it flight path into the restricted area indicated by the BS, and enforce the specified reverse DRM policy/policies while flying/operating near or over the restricted area indicated by the BS.

At block 220, the drone may confirm enforcement of the specified reverse DRM policy/policies with the BS. In alternate embodiments, where possible, the BS may also monitor and independently verify whether the drone is complying with specified reverse DRM policy/policies. For example, if one of the specified reverse DRM policy/policies calls for the drone to operate above a specified altitude, or at certain speed range, the BS may independently verify whether the drone indeed is flying over the restricted area at an altitude above the specified altitude restriction, or within the specified speed range.

In embodiments, failure to comply with a certified BS's specified reverse DRM geo-fencing policy/policies may cause a drone to lose its certificate (revoked by the issuing non-governmental or governmental body).

Figure 3:
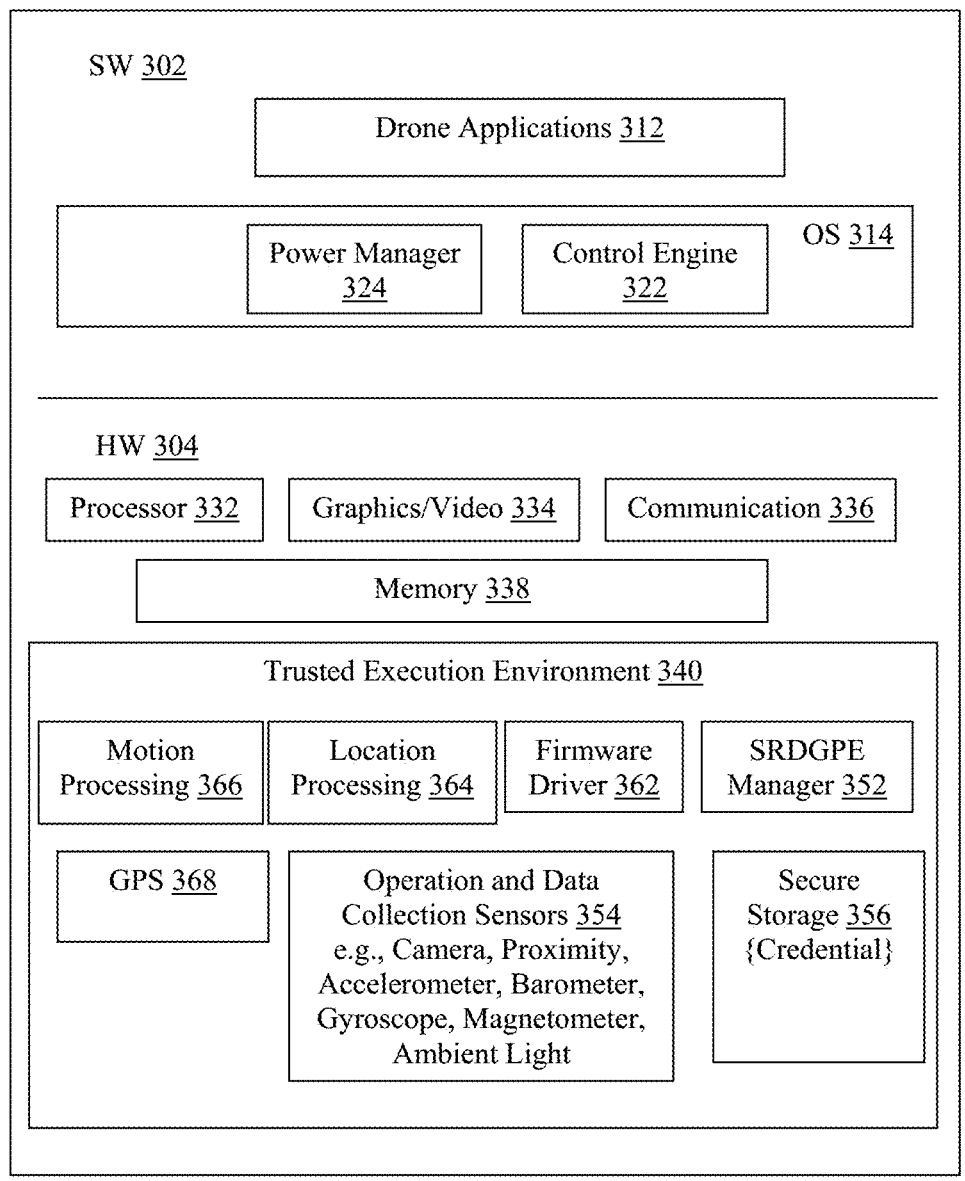
FIG. 3 illustrates example architecture of a UAV equipped to practice the process for reverse DRM geo-fencing of UAV, according to some embodiments.

FIG. 3 illustrates example architecture of a UAV equipped to practice the process for reverse DRM geo-fencing of UAV, according to some embodiments. As shown, drone 300, which may be any one of drones 104a-104n, may include various software and hardware components 302 and 304. Software components 302 may include various drone applications 312 and operating system (OS) 314. OS 314 may include various utilities and services, e.g., control engine 322 and power manager 324. Control engine 322 may be configured to provide control services to control various hardware components 304. Similarly, power manager 324 may be configured to control power consumption of various hardware components 304. In general, software components 302 may be any one of a number of software components known in the art.

Hardware components 304 may include processor 332, graphics/video components 334, communication components 336, memory 338 and trusted execution environment (TEE) 340. Processor 332 may be any one of a number of single or multi-core processors. Graphics/video components 334 may be any one of a number of graphics/video processors. Communication components 336 may be any one of a number of wireless transmitters/receivers and antenna arrangements. Memory 338 may be any one of a number of volatile and/or non-volatile storage medium. Memory 338 may include one or more level of cache memory. TEE 340 may be any one of a number of hardware and/or software secure execution arrangements to secure and protect the components involved in providing the reverse DRM geo-fencing policy enforcement from tampering by malicious attackers. For example, TEE 340 may be provided by a dedicated manageability engine (operating in a dedicated core of processor 332), using the execution enclave feature provided by the Software Guard Extension (SGX) to the x86

Instruction Set of Intel® x86 processors (when processor 332 is an x86 processor that supports SGX), using a secure system management mode feature of processor 332 (e.g., System Management Interrupt (SMI) of x86 processors when processor 332 is an x86 processor), or using the TrustZone® technology (when processor 332 is an ARM® processor).

TEE 340 may include SRDGPE manager 352, various flight operation and data collection sensors 354 and secure storage 356. Operation sensors 354 may include, e.g., but not limited to, altimeter, proximity sensor, accelerometer, gyroscope, barometer, and so forth, to collect operational sensor data for flight operation of drone 300. Data collection sensors 354 may include, e.g., but not limited to, optical and/or thermal camera, ultra or audible sonic scanner, thermometer, ambient light sensor, and so forth, to collect data on targets within various geographic areas. Some sensors 354 such as camera, thermometer, and so forth, may serve as operational sensors as well as data collection sensors. SRDGPE manager 352 may be configured with logic to perform the various earlier described drone operations associated with secure reverse DRM geo-fencing policy enforcement, including in particular, enforcing reverse DRM geo-fencing policy/policies specified by a BS of a privacy sensitive geographic area on data collection sensors 354. Secure storage 356 may be configured to store the drone's certificate for remote attestation/authentication with various BS assigned to enforce reverse DRM geo-fencing policy/policies for various privacy sensitive geographic areas. Additional secure storage 356 may be configured to store various working data associated with flight operation and/or reverse DRM geo-fencing policy enforcement.

In addition, in embodiments, TEE 340 may include firmware drivers 362, location processing logic 364, motion processing logic 366, and global position system (GPS) 368. Firmware drivers 362 may include any number of firmware drivers to facilitate access, control and operation of hardware components 304 by services and utilities of OS 314. Location processing logic 364 may be configured to process sensor and GPS data in determining the location of drone 300 at any point in time. Motion processing logic 366 may be configured to process sensor and GPS data in determining the speed, orientation, and so forth of drone 300 at any point in time. GPS 368 may be any one of a number of known GPS components configure to provide GPS data. These elements are non-essential elements in practicing secure reverse DRM geo-fencing of UAV, accordingly will not be further described.

Figure 4:
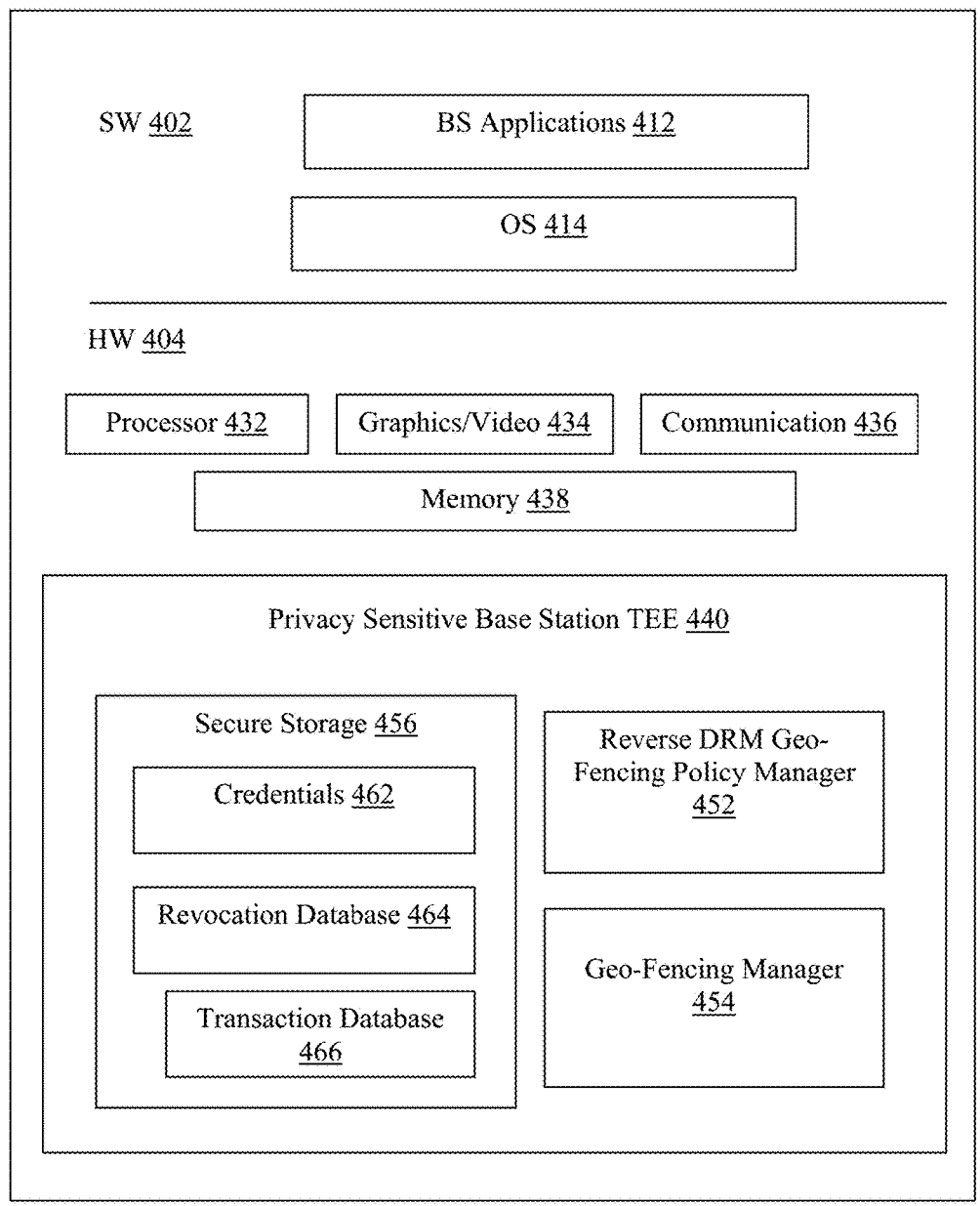
FIG. 4 illustrates example architecture of a BS equipped to practice the process for reverse DRM geo-fencing of UAV, according to some embodiments.

FIG. 4 illustrates example architecture of a BS equipped to practice the process for reverse DRM geo-fencing of UAV, according to some embodiments. As shown, BS 400, which may be BS 102, may include various software and hardware components 402 and 404. Software components 402 may include various BS applications 412 and OS 414. BS applications 412 and OS 414 may be any one of a number of such elements known in the art.

Hardware components 404 may include processor 432, graphics/video components 434, communication components 436, memory 438 and trusted execution environment (TEE) 440. Processor 432 may be any one of a number of single or multi-core processors. Graphics/video components 434 may be any one of a number of graphics/video processors. Communication components 436 may be any one of a number of wireless transmitters/receivers and antenna arrangements. Memory 438 may be any one of a number of volatile and/or non-volatile storage medium. Memory 438 may include one or more level of cache memory. TEE 440 may be any one of a number of hardware and/or software secure execution arrangements to secure and protect the components involved in providing the reverse DRM geo-fencing policy enforcement from tempering by malicious attackers. Similar to drone 300, TEE 440 may be provided by a dedicated manageability engine (operating in a dedicated core of processor 432), using the execution enclave feature provided by the Software Guard Extension (SGX) to the x86 Instruction Set of Intel® x86 processors (when processor 432 is an x86 processor that supports SGX), using a secure system management mode feature of processor 432 (e.g., System Management Interrupt (SMI) of x86 processors when processor 432 is an x86 processor), or using the TrustZone® technology (when processor 432 is an ARM® processor).

TEE 440 may include SRDGPE manager 452, geo-fencing manager 454, and secure storage 356. Geo-fencing manager 454 may be configured to provide the geo-fencing information, including, but are not limited to, the location and perimeter information of a privacy sensitive geographic area (e.g., its restricted and comfort zones). SRDGPE manager 452 may be configured with logic to perform the various earlier described BS operations associated with secure reverse DRM geo-fencing policy enforcement. Secure storage 456 may be configured to store the BS's certificate 462 for remote attestation/authentication with various drones. Additional secure storage 456 may be configured to store transaction database 464 and revocation data 466 configured to store transaction and revocation information as described earlier. In embodiments, secure storage 456 may also be configured to store various working data associated with BS operation and/or reverse DRM geo-fencing policy enforcement.

Figure 5:
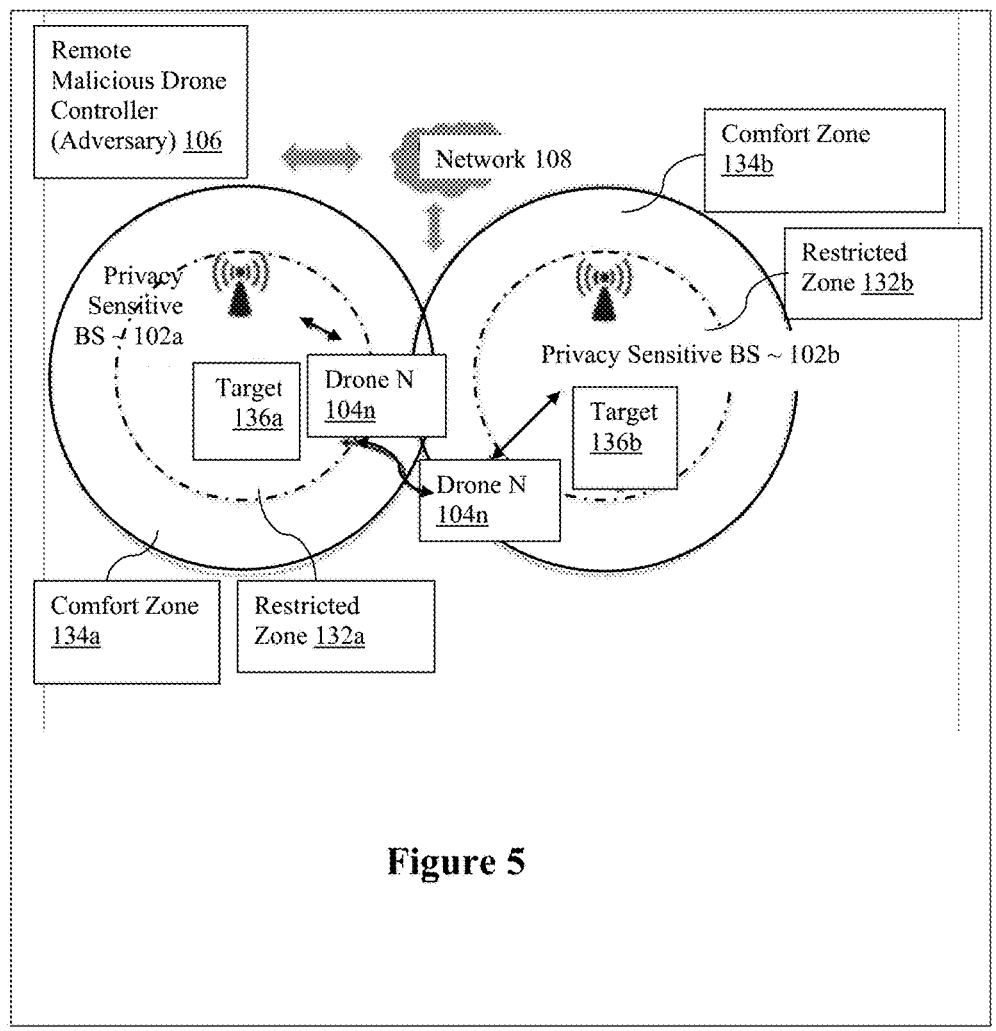
FIG. 5 illustrates another overview of two BSs practicing secure reverse DRM geo-fencing of UAVs over two privacy sensitive geographic areas, in accordance with various embodiments.

FIG. 5 illustrates another overview of two BSs practicing secure reverse DRM geo-fencing of UAVs over two privacy sensitive geographic areas, in accordance with various embodiments. As illustrated, in environment 100', BS 102a and 102b may be respectively configured with secure geo-fencing manager, SRDGPE manager, and secure storage, incorporated with the teachings of the present disclosure, as BS 102 of FIG. 1. Similar to BS 102 of FIG. 1, each secure geo-fencing manager may be configured to define the location and perimeter of privacy sensitive restricted zone 132a or 132b, while the corresponding SRDGPE manager may be configured to enforce reverse DRM policy or policies on collection of data on target(s) 136a or 136b within the corresponding privacy sensitive restricted zone 132a or 132b by drone 104n. Additionally, each secure geo-fencing manager may be configured to define the location and perimeter of comfort zone 134a or 134b encompassing the corresponding restricted zone 132a or 132b, while the corresponding SRDGPE manager may be configured to begin to authenticate drone 104n, as drone 104n enters comfort zone 134a or 134b and heading towards restricted zone 132a or 132b. Further, the corresponding SRDGPE manager may be configured to authorize drone 104n, on authentication, to collect data on target(s) 136a or 136b within restricted zone 132a or 132b, including conveying to drone 104n the reverse DRM policy or policies to be enforced by drone 104n on collection of data on target(s) 136a or 136b within restricted zone 132a or 132b, while operating over or near restricted zone 132a or 132b.

Additionally, the corresponding SRDGPE manager may be configured to ascertain compliance of the drone 104n with the reverse DRM policy or policies, including revocation of authorization on determination of non-compliance or failure to enforce the reverse DRM policy or policies. As BS 102 of FIG. 1, the corresponding secure storage may be configured to store the corresponding authentication certificate of BS 102a or 102b and various operational databases to support the operation of the corresponding secure geo-fencing manager and SRDGPE manager. In embodiments, the operational databases may likewise include, but are not limited to, a transactional database to store transactions (attestations/verifications) with drone 104n, and a revocation database to store denials of permission to collect data or revocation of granted permissions (e.g., for failure to comply or otherwise enforce the applicable reverse DRM geo-fencing policy/policies).

Drone 104n may be configured as earlier described with respect to each of drone 104* of FIG. 1.

For environment 100', the respective SRDGPE managers of BS 102a and 102b may be configured to cooperate with each other, directly or via a cloud server, to streamline the enforcement of reverse DRM geo-fencing policy/policies. For example, the authorization token provided to the SRFGPE manager of BS 102a may include a unique identifier. As drone 104n transitions from privacy sensitive geographic area 132a to privacy sensitive geographic area 132b, drone 104n may present the authorization token obtained from BS 102a to BS 102b to obtain authorization and streamline the remote attestation process. To facilitate such streamlined operation, on provision of the authorization token to drone 104n, BS 102a may inform BS 102b of the authorization token provided. In alternate embodiments, the SRFGPE manager of BS 102b may be configured with logic to recognize the authorization token provided by BS 102a. In other words, BS 102b may be configured to honor the authorization granted by BS 102a.

In alternate embodiments, to facilitate streamlined operations, the SRFGPE manager of BS 102a may be configured to inform the SRFGPE manager of BS 102b whether drone 104n complied with its reverse DRM geo-fencing policy/policies, while drone 104n operated near or over restricted zone 132a. Further, the SRFGPE manager of BS 102a may be configured to provide the SRFGPE manager of BS 102b with information on the behavior of drone 104n, while drone 104n operated near or over restricted zone 132a.

Figure 6:
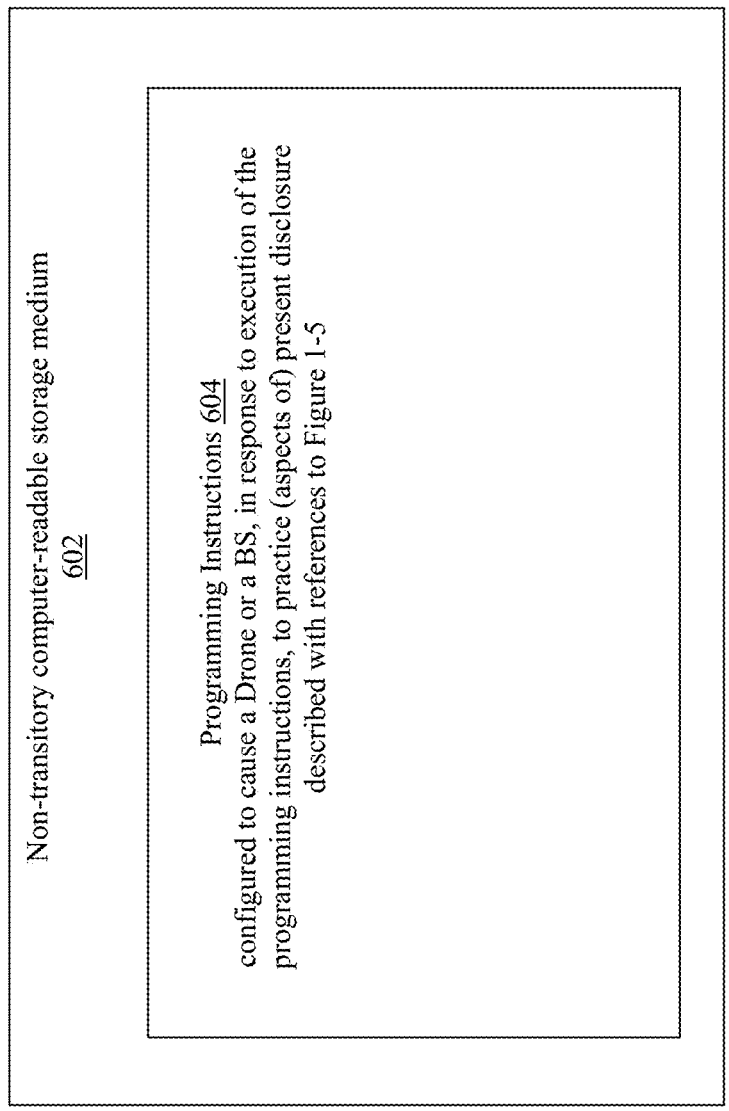
FIG. 6 illustrates an example computer-readable storage medium with instructions configured to enable a BS or a drone to practice aspects of the present disclosure, in accordance with various embodiments.

FIG. 6 illustrates an example non-transitory computer-readable storage medium having instructions configured to practice all or selected ones of the operations associated with BS 102 or drones 104a-104n, and so forth, earlier described, in accordance with various embodiments. As illustrated, non-transitory computer-readable storage medium 602 may include a number of programming instructions 604. Programming instructions 604 may be configured to enable an apparatus, e.g., BS 102 or drone 104*, in response to execution of the programming instructions, to perform various BS or drone operations earlier described. In alternate embodiments, programming instructions 604 may be disposed on multiple non-transitory computer-readable storage media 602 instead. In still other embodiments, programming instructions 604 may be encoded in transitory computer readable signals.

Referring back to FIGS. 3 and 4, for some embodiments, at least one of processors 332 or 432 may be packaged together with a computer-readable storage medium having programming instructions 604 configured to practice all or selected aspects of the BS or drone operations associated with reverse DRM geo-fencing of UAV. For one embodiment, at least one of processors 332 or 432 may be packaged together with a computer-readable storage medium having programming instructions 604 to form a System in Package (SiP). For one embodiment, at least one of processors 332 or 432 may be integrated on the same die with a computer-readable storage medium having programming instructions 604. For one embodiment, at least one of processors 332 or 432 may be packaged together with a computer-readable storage medium having programming instructions 604 to form a System on Chip (SoC).

Example 1 may be an unmanned aerial vehicle (UAV), comprising: first one or more sensors to provide first one or more sensor data for aerial operation of the UAV over or near a geographic area; second one or more sensors to collect second one or more sensor data of one or more targets within the geographic area; and a reverse digital right management geo-fence policy enforcement (RDGFPE) manager coupled with the first and second one or more sensors to enforce one or more reverse digital right management geo-fence policies on operation of the second one or more sensors while the UAV operates over or near the geographic area.

Example 2 may be example 1, wherein the RDGFPE manager may receive an authentication beacon transmitted by a base station associated with the geographic area, wherein the authentication beacon may include a credential of the base station; wherein the RDGFPE manager may authenticate the credential of the base station, and on authentication of the credential of the base station, perform remote attestation to the base station area.

Example 3 may be example 1, wherein the authentication beacon transmitted by the base station may further include location or perimeter information of the geographic area.

Example 4 may be example 2, further comprising a secure storage to securely store a credential of the UAV, wherein the authentication beacon transmitted by the base station may include a request for the credential of the UAV, and wherein to perform remote attestation, the RDGFPE manager may provide the credential of the UAV to the base station associated with the geographic area.

Example 5 may be example 2, wherein the RDGFPE manager may receive from the base station instructions to enforce the one or more reverse digital right management geo-fence policies on operation of the second one or more sensors while the UAV operates over or near the geographic area; determine whether enforcement of the one or more reverse digital right management geo-fence policies on operation of the second one or more sensors while the UAV operates over or near the geographic area is acceptable; and enforce the one or more reverse digital right management geo-fence policies on operation of the second one or more sensors while the UAV operates over or near the geographic area, on determination that enforcement of the one or more reverse digital right management geo-fence policies on operation of the second one or more sensors while the UAV operates over or near the geographic area is acceptable.

Example 6 may be example 5, wherein the RDGFPE manager may further receive the one or more reverse digital right management geo-fence policies from the base station or a cloud server.

Example 7 may be example 5, further comprising a secure storage to securely pre-store a plurality of reverse digital right management geo-fence policies including the one or more reverse digital right management geo-fence policies, and the RDGFPE manager may receive one or more identifications of the one or more reverse digital right management geo-fence policies from the base station.

Example 8 may be example 5, wherein the RDGFPE manager may cause cessation of operation of the second one or more sensors while the UAV operates over or near the geographic area or to cause the UAV to operate away from the geographic area, on determination that enforcement of the one or more reverse digital right management geo-fence policies on operation of the second one or more sensors while the UAV operates over or near the geographic area is unacceptable.

Example 9 may be example 2, wherein the RDGFPE manager may confirm to the base station enforcement of the one or more reverse digital right management geo-fence policies on operation of the second one or more sensors while the UAV operates over or near the geographic area; wherein the second one or more sensors include at least a camera, and wherein the first one or more sensors include one or more of an accelerometer, a barometer, a gyroscope, a magnetometer, and an ambient light sensor.

Example 10 may be any one of examples 1-9, further comprising a trusted execution environment to host at least the RDGFPE manager.

Example 11 may be a method for operating an unmanned aerial vehicle (UAV), comprising: operating first one or more sensors of the UAV to provide first one or more sensor data for aerial operation of the UAV over or near a geographic area; operating second one or more sensors to collect second one or more sensor data of one or more targets within the geographic area; and enforcing, with a reverse digital right management geo-fence policy enforcement (RDGFPE) manager, one or more reverse digital right management geo-fence policies on operating of the second one or more sensors while operating the UAV over or near the geographic area.

Example 12 may be example 11, wherein enforcing may comprise the RDGFPE manager receiving an authentication beacon transmitted by a base station associated with the geographic area, wherein the authentication beacon may include a credential of the base station; and the RDGFPE manager authenticating the credential of the base station, and on authentication of the credential of the base station, performing remote attestation to the base station area.

Example 13 may be example 11, wherein the authentication beacon transmitted by the base station may further include location or perimeter information of the geographic area.

Example 14 may be example 12, further comprising securely storing a credential of the UAV, wherein the authentication beacon transmitted by the base station may include a request for the credential of the UAV, and wherein performing remote attestation may include the RDGFPE manager providing the credential of the UAV to the base station associated with the geographic area.

Example 15 may be example 12, wherein enforcing may further comprise the RDGFPE manager receiving from the base station instructions to enforce the one or more reverse digital right management geo-fence policies on operation of the second one or more sensors while the UAV is operating over or near the geographic area; determining whether enforcement of the one or more reverse digital right management geo-fence policies on operation of the second one or more sensors while the UAV is operating over or near the geographic area is acceptable; and enforcing the one or more reverse digital right management geo-fence policies on operation of the second one or more sensors while the UAV is operating over or near the geographic area, on determination that enforcement of the one or more reverse digital right management geo-fence policies on operation of the second one or more sensors while the UAV is operating over or near the geographic area is acceptable.

Example 16 may be example 15, wherein receiving may further comprise the RDGFPE manager receiving the one or more reverse digital right management geo-fence policies from the base station or a cloud server.

Example 17 may be example 15, further comprising securely pre-storing a plurality of reverse digital right management geo-fence policies including the one or more reverse digital right management geo-fence policies, and receiving may comprise the RDGFPE manager receiving one or more identifications of the one or more reverse digital right management geo-fence policies from the base station.

Example 18 may be example 15, wherein enforcing may comprise the RDGFPE manager causing cessation of operation of the second one or more sensors while the UAV is operating over or near the geographic area or causing the UAV to operate away from the geographic area, on determination that enforcement of the one or more reverse digital right management geo-fence policies on operation of the second one or more sensors while the UAV is operating over or near the geographic area is unacceptable.

Example 19 may be example 12, wherein enforcing may further comprise the RDGFPE manager confirming to the base station enforcement of the one or more reverse digital right management geo-fence policies on operation of the second one or more sensors while the UAV is operating over or near the geographic area; wherein the second one or more sensors include at least a camera, and wherein the first one or more sensors include one or more of an accelerometer, a barometer, a gyroscope, a magnetometer, and an ambient light sensor.

Example 20 may be any one of examples 11-19, further comprising operating a trusted execution environment to host at least the RDGFPE manager.

Example 21 may be one or more computer-readable media comprising instructions that cause an unmanned aerial vehicle (UAV), in response to execution of the instructions by one or more processors of the UAV, to provide a reverse digital right management geo-fence policy enforcement (RDGFPE) manager to enforce one or more reverse digital right management geo-fence policies on operation of second one or more sensors while the UAV operates over or near a geographic area; wherein the second one or more sensors are to collect second one or more sensor data of one or more targets within the geographic area; and wherein the UAV may further comprise first one or more sensors to provide first one or more sensor data for aerial operation of the UAV over or near the geographic area.

Example 22 may be example 21, wherein the RDGFPE manager may receive an authentication beacon transmitted by a base station associated with the geographic area, wherein the authentication beacon may include a credential of the base station; wherein the RDGFPE manager may authenticate the credential of the base station, and on authentication of the credential of the base station, perform remote attestation to the base station area.

Example 23 may be example 21, wherein the authentication beacon transmitted by the base station may further include location or perimeter information of the geographic area.

Example 24 may be example 22, wherein the UAV may further comprise a secure storage to securely store a credential of the UAV, wherein the authentication beacon transmitted by the base station may include a request for the credential of the UAV, and wherein to perform remote attestation, the RDGFPE manager may provide the credential of the UAV to the base station associated with the geographic area.

Example 25 may be example 22, wherein the RDGFPE manager may receive from the base station instructions to enforce the one or more reverse digital right management geo-fence policies on operation of the second one or more sensors while the UAV operates over or near the geographic area; determine whether enforcement of the one or more reverse digital right management geo-fence policies on operation of the second one or more sensors while the UAV operates over or near the geographic area is acceptable; and enforce the one or more reverse digital right management geo-fence policies on operation of the second one or more sensors while the UAV operates over or near the geographic area, on determination that enforcement of the one or more reverse digital right management geo-fence policies on operation of the second one or more sensors while the UAV operates over or near the geographic area is acceptable.

Example 26 may be example 25, wherein the RDGFPE manager may further receive the one or more reverse digital right management geo-fence policies from the base station or a cloud server.

Example 27 may be example 25, wherein the UAV may further comprise a secure storage to securely pre-store a plurality of reverse digital right management geo-fence policies including the one or more reverse digital right management geo-fence policies, and the RDGFPE manager may receive one or more identifications of the one or more reverse digital right management geo-fence policies from the base station.

Example 28 may be example 25, wherein the RDGFPE manager may cause cessation of operation of the second one or more sensors while the UAV operates over or near the geographic area or to cause the UAV to operate away from the geographic area, on determination that enforcement of the one or more reverse digital right management geo-fence policies on operation of the second one or more sensors while the UAV operates over or near the geographic area is unacceptable.

Example 29 may be example 22, wherein the RDGFPE manager may confirm to the base station enforcement of the one or more reverse digital right management geo-fence policies on operation of the second one or more sensors while the UAV operates over or near the geographic area; wherein the second one or more sensors include at least a camera, and wherein the first one or more sensors include one or more of an accelerometer, a barometer, a gyroscope, a magnetometer, and an ambient light sensor.

Example 30 may be any one of examples 21-29, wherein the UAV may further comprise a trusted execution environment to host at least the RDGFPE manager.

Example 31 may be an apparatus of unmanned aerial operation, comprising: means for providing first one or more sensor data for aerial operation of the apparatus over or near a geographic area; means for collecting second one or more sensor data of one or more targets within the geographic area; and means for enforcing one or more reverse digital right management geo-fence policies on the means for collecting second one or more sensor data, while operating the apparatus over or near the geographic area.

Example 32 may be example 31, wherein means for enforcing may comprise means for receiving an authentication beacon transmitted by a base station associated with the geographic area, wherein the authentication beacon may include a credential of the base station; and means for authenticating the credential of the base station, and on authentication of the credential of the base station, performing remote attestation to the base station area.

Example 33 may be example 31, wherein the authentication beacon transmitted by the base station may further include location or perimeter information of the geographic area.

Example 34 may be example 32, further comprising means for securely storing a credential of the apparatus, wherein the authentication beacon transmitted by the base station may include a request for the credential of the apparatus, and wherein means for performing remote attestation may include means for providing the credential of the apparatus to the base station associated with the geographic area.

Example 35 may be example 32, wherein means for enforcing may further comprise means for receiving from the base station instructions to enforce the one or more reverse digital right management geo-fence policies on operation of the second one or more sensors while the apparatus is operating over or near the geographic area; means for determining whether enforcement of the one or more reverse digital right management geo-fence policies on operation of the second one or more sensors while the apparatus is operating over or near the geographic area is acceptable; and means for enforcing the one or more reverse digital right management geo-fence policies on operation of the second one or more sensors while the apparatus is operating over or near the geographic area, on determination that enforcement of the one or more reverse digital right management geo-fence policies on operation of the second one or more sensors while the apparatus is operating over or near the geographic area is acceptable.

Example 36 may be example 35, wherein receiving may further comprise means for receiving the one or more reverse digital right management geo-fence policies from the base station or a cloud server.

Example 37 may be example 35, further comprising means for securely pre-storing a plurality of reverse digital right management geo-fence policies including the one or more reverse digital right management geo-fence policies, and means for receiving may comprise means for receiving one or more identifications of the one or more reverse digital right management geo-fence policies from the base station.

Example 38 may be example 35, wherein means for enforcing may comprise means for causing cessation of operation of the second one or more sensors while the apparatus is operating over or near the geographic area or means for causing the apparatus to operate away from the geographic area, on determination that enforcement of the one or more reverse digital right management geo-fence policies on operation of the second one or more sensors while the apparatus is operating over or near the geographic area is unacceptable.

Example 39 may be example 32, wherein means for enforcing may further comprise means for confirming to the base station enforcement of the one or more reverse digital right management geo-fence policies on operation of the second one or more sensors while the apparatus is operating over or near the geographic area; wherein the second one or more sensors include at least a camera, and wherein the first one or more sensors include one or more of an accelerometer, a barometer, a gyroscope, a magnetometer, and an ambient light sensor.

Example 40 may be any one of examples 31-39, further comprising means for operating a trusted execution environment to host at least the means for enforcing.

Example 41 may be a base station for enforcing one or more reverse digital right management geo-fence policies for a geographic area, comprising: a communication interface including a transmitter and an antenna; an a reverse digital right management geo-fence policy (RDGFP) manager coupled with the communication interface to instruct an unmanned aerial vehicle (UAV), via the communication interface, to enforce one or more reverse digital right management geo-fence policies on operation of one or more sensors of the UAV on collecting sensor data of a target within the geographic area while the UAV operates over or near the geographic area.

Example 42 may be example 41, wherein the RDGFP manager may transmit an authentication beacon to the UAV to request the UAV to perform remote attestation with the base station, as the UAV comes within a pre-determined distance from the geographic area.

Example 43 may be example 42, wherein the RDGFP manager may transmit an authentication beacon that may include location or perimeter information of the geographic area.

Example 44 may be example 42, further comprising a secure storage to securely store a credential of the base station, wherein the RDGFP manager may transmit an authentication beacon that may include the credential of the base station, and a request for a credential of the UAV, and wherein to perform remote attestation, the UAV may provide the requested credential of the UAV to the base station.

Example 45 may be example 44, wherein the RDGFP manager may receive from the UAV the requested credential of the UAV; authenticate the received credential of the UAV; on authentication, determine whether the UAV may be authorized to collect any sensor data of the target within the geographic area; and on determination that the UAV is authorized to collect at least some, but not all, sensor data of the target within the geographic area, the RDGFP manager may further identify the one or more reverse digital right management geo-fence policies.

Example 46 may be example 45, wherein on identification of the one or more reverse digital right management geo-fence policies, the RDGFP manager may inform the UAV of the one or more reverse digital right management geo-fence policies or provide the UAV of the one or more reverse digital right management geo-fence policies; and wherein the base station may further comprise a transaction database to log the authorization of the UAV and identification or provision of the one or more reverse digital right management geo-fence policies to the UAV.

Example 47 may be example 41, wherein the RDGFP manager may further receive confirmation from the UAV to confirm enforcement of the one or more reverse digital right management geo-fence policies on operation of the one or more sensors of the UAV while the UAV operates over or near the geographic area.

Example 48 may be example 41, wherein the RDGFP manager may further determine whether the UAV is enforcing the one or more reverse digital right management geo-fence policies on operation of the one or more sensors of the UAV while the UAV operates over or near the geographic area, and on determination that the UAV is not enforcing the one or more reverse digital right management geo-fence policies on operation of the one or more sensors of the UAV while the UAV operates over or near the geographic area, revoke authorization of the UAV to collect any sensor data of the target within the geographic area; and wherein the base station may further include a revocation database to log the revocation of the authorization of the UAV to collect any sensor data of the target within the geographic area.

Example 49 may be example 41 further comprising a geo-fencing manager to define the geographic area, and the RDGFP manager may further share transactions with the UAV, including revocation of authorization, if any, with another base station.

Example 50 may be any one of examples 41-49, further comprising a trusted execution environment to host at least the RDGFP manager.

Example 51 may be a base station method for enforcing one or more reverse digital right management geo-fence policies for a geographic area, comprising: generating, with a reverse digital right management geo-fence policy (RDGFP) manager of the base station, one or more instructions to an unmanned aerial vehicle (UAV) to enforce the one or more reverse digital right management geo-fence policies on operation of one or more sensors of the UAV to collect sensor data of a target within the geographic area while the UAV operates over or near the geographic area; and transmitting, via a communication interface with a transmitter and an antenna, the instructions to the UAV.

Example 52 may be example 51, wherein transmitting may further comprise the RDGFP manager transmitting an authentication beacon to the UAV to request the UAV to perform remote attestation with the base station, as the UAV comes within a pre-determined distance from the geographic area.

Example 53 may be example 52, wherein transmitting an authentication beacon may comprise the RDGFP manager transmitting an authentication beacon that may include location or perimeter information of the geographic area.

Example 54 may be example 52, may further comprise securely storing a credential of the base station, wherein transmitting an authentication beacon may comprise the RDGFP manager transmitting an authentication beacon that may include the credential of the base station, and a request for a credential of the UAV, and wherein to perform remote attestation, the UAV may provide the requested credential of the UAV to the base station.

Example 55 may be example 54, further comprising the RDGFP manager receiving from the UAV the requested credential of the UAV; authenticate the received credential of the UAV; on authentication, determining whether the UAV may be authorized to collect any sensor data of the target within the geographic area; and on determination that the UAV is authorized to collect at least some, but not all, sensor data of the target within the geographic area, the RDGFP manager further identifying the one or more reverse digital right management geo-fence policies.

Example 56 may be example 55, further comprising on identification of the one or more reverse digital right management geo-fence policies, the RDGFP manager informing the UAV of the one or more reverse digital right management geo-fence policies or providing the UAV of the one or more reverse digital right management geo-fence policies; and wherein the base station method may further comprise logging the authorization of the UAV and identification or provision of the one or more reverse digital right management geo-fence policies to the UAV.

Example 57 may be example 51, further comprising the RDGFP manager receiving confirmation from the UAV to confirm enforcement of the one or more reverse digital right management geo-fence policies on operation of the one or more sensors of the UAV while the UAV is operating over or near the geographic area.

Example 58 may be example 51, wherein the RDGFP manager may further determine whether the UAV is enforcing the one or more reverse digital right management geo-fence policies on operation of the one or more sensors of the UAV while the UAV is operating over or near the geographic area, and on determination that the UAV is not enforcing the one or more reverse digital right management geo-fence policies on operation of the one or more sensors of the UAV while the UAV is operating over or near the geographic area, revoking authorization of the UAV to collect any sensor data of the target within the geographic area; and wherein the base station method may further include logging the revocation of the authorization of the UAV to collect any sensor data of the target within the geographic area.

Example 59 may be example 51 further comprising defining the geographic area, and sharing transactions with the UAV, including revocation of authorization, if any, with another base station.

Example 60 may be any one of examples 51-59, further comprising operating a trusted execution environment to host at least the generating and transmitting operations.

Example 61 may be one or more computer-readable media comprising instructions that cause a base station, in response to execution of the instructions by one or more processors of the base station, to provide a reverse digital right management geo-fence policy (RDGFP) manager to instruct an unmanned aerial vehicle (UAV), via a communication interface of the base station, to enforce one or more reverse digital right management geo-fence policies on operation of one or more sensors of the UAV on collecting sensor data of the target within the geographic area while the UAV operates over or near the geographic area; wherein the communication interface of the base station may include a transmitter and an antenna.

Example 62 may be example 61, wherein the RDGFP manager may transmit an authentication beacon to the UAV to request the UAV to perform remote attestation with the base station, as the UAV comes within a pre-determined distance from the geographic area.

Example 63 may be example 62, wherein the RDGFP manager may transmit an authentication beacon that may include location or perimeter information of the geographic area.

Example 64 may be example 62, wherein the BS may further comprise a secure storage to securely store a credential of the base station, wherein the RDGFP manager may transmit an authentication beacon that may include the credential of the base station, and a request for a credential of the UAV, and wherein to perform remote attestation, the UAV may provide the requested credential of the UAV to the base station.

Example 65 may be example 64, wherein the RDGFP manager may receive from the UAV the requested credential of the UAV; authenticate the received credential of the UAV; on authentication, determine whether the UAV may be authorized to collect any sensor data of the target within the geographic area; and on determination that the UAV is authorized to collect at least some, but not all, sensor data of the target within the geographic area, the RDGFP manager may further identify the one or more reverse digital right management geo-fence policies.

Example 66 may be example 65, wherein on identification of the one or more reverse digital right management geofence policies, the RDGFP manager may inform the UAV of the one or more reverse digital right management geo-fence policies or provide the UAV of the one or more reverse digital right management geo-fence policies; and wherein the base station may further comprise a transaction database to log the authorization of the UAV and identification or provision of the one or more reverse digital right management geo-fence policies to the UAV.

Example 67 may be example 61, wherein the RDGFP manager may further receive confirmation from the UAV to confirm enforcement of the one or more reverse digital right management geo-fence policies on operation of the one or more sensors of the UAV while the UAV operates over or near the geographic area.

Example 68 may be example 61, wherein the RDGFP manager may further determine whether the UAV is enforcing the one or more reverse digital right management geo-fence policies on operation of the one or more sensors of the UAV while the UAV operates over or near the geographic area, and on determination that the UAV is not enforcing the one or more reverse digital right management geo-fence policies on operation of the one or more sensors of the UAV while the UAV operates over or near the geographic area, revoke authorization of the UAV to collect any sensor data of the target within the geographic area; and wherein the base station may further include a revocation database to log the revocation of the authorization of the UAV to collect any sensor data of the target within the geographic area.

Example 69 may be example 61 wherein the base station may further comprise a geo-fencing manager to define the geographic area, and the RDGFP manager may further share transactions with the UAV, including revocation of authorization, if any, with another base station.

Example 70 may be any one of examples 61-69, wherein the base station may further comprise a trusted execution environment to host at least the RDGFP manager.

Example 71 may be an apparatus of unmanned aerial operation, comprising: means for generating one or more instructions to an unmanned aerial vehicle (UAV) to enforce the one or more reverse digital right management geo-fence policies on operation of one or more sensors of the UAV to collect sensor data of a target within the geographic area while the UAV operates over or near the geographic area; and means for transmitting the instructions to the UAV.

Example 72 may be example 71, wherein means for transmitting may further comprise means for transmitting an authentication beacon to the UAV to request the UAV to perform remote attestation with the base station, as the UAV comes within a pre-determined distance from the geographic area.

Example 73 may be example 72, wherein means for transmitting an authentication beacon may comprise means for transmitting an authentication beacon that may include location or perimeter information of the geographic area.

Example 74 may be example 72, may further comprise means for securely storing a credential of the apparatus, wherein means for transmitting an authentication beacon may comprise means for transmitting an authentication beacon that may include the credential of the base station, and a request for a credential of the UAV, and wherein to perform remote attestation, the UAV may provide the requested credential of the UAV to the base station.

Example 75 may be example 74, further comprising means for receiving from the UAV the requested credential of the UAV; means for authenticate the received credential of the UAV; on authentication, determining whether the UAV may be authorized to collect any sensor data of the target within the geographic area; and means for, on determination that the UAV is authorized to collect at least some, but not all, sensor data of the target within the geographic area, identifying the one or more reverse digital right management geo-fence policies.

Example 76 may be example 75, further comprising means for, on identification of the one or more reverse digital right management geo-fence policies, informing the UAV of the one or more reverse digital right management geo-fence policies or providing the UAV of the one or more reverse digital right management geo-fence policies; and wherein the apparatus may further comprise means for logging the authorization of the UAV and identification or provision of the one or more reverse digital right management geo-fence policies to the UAV.

Example 77 may be example 71, further comprising means for receiving confirmation from the UAV to confirm enforcement of the one or more reverse digital right management geo-fence policies on operation of the one or more sensors of the UAV while the UAV is operating over or near the geographic area.

Example 78 may be example 71, further comprising means for determine whether the UAV is enforcing the one or more reverse digital right management geo-fence policies on operation of the one or more sensors of the UAV while the UAV is operating over or near the geographic area, and means for, on determination that the UAV is not enforcing the one or more reverse digital right management geo-fence policies on operation of the one or more sensors of the UAV while the UAV is operating over or near the geographic area, revoking authorization of the UAV to collect any sensor data of the target within the geographic area; and wherein the apparatus may further comprise means for logging the revocation of the authorization of the UAV to collect any sensor data of the target within the geographic area.

Example 79 may be example 71 further comprising means for defining the geographic area, and means for sharing transactions with the UAV, including revocation of authorization, if any, with another base station.

Example 80 may be any one of examples 71-79, further comprising means for operating a trusted execution environment to host at least the means for generating and means for transmitting.

Example 81 may be a system, comprising: an unmanned aerial vehicle (UAV); and a base station for enforcing one or more reverse digital right management geo-fence policies on operation of the UAV for a geographic area. The base station may comprise: a communication interface including a transmitter and an antenna; and a trusted execution environment (TEE) having at least a reverse digital right management geo-fence policy (RDGFP) manager coupled with the communication interface to instruct the UAV, via the communication interface, to enforce the one or more reverse digital right management geo-fence policies on operation of one or more sensors of the UAV on collecting sensor data of a target within the geographic area while the UAV operates over or near the geographic area. The UAV may comprise: first one or more sensors to provide first one or more sensor data for aerial operation of the UAV over or near a geographic area; second one or more sensors to collect second one or more sensor data of one or more targets within the geographic area; and a trusted execution environment (TEE) having at least a reverse digital right management geo-fence policy enforcement (RDGFPE) manager coupled with the first and second one or more sensors to enforce one or more reverse digital right management geo-fence policies on operation of the second one or more sensors while the UAV operates over or near the geographic area.

Example 82 may be example 81, wherein the RDGFP manager may transmit an authentication beacon to the UAV to request the UAV to perform remote attestation with the base station, as the UAV comes within a pre-determined distance from the geographic area, wherein the base station may further comprise a secure storage to securely store a credential of the base station, and the authentication beacon may include a credential of the base station; and wherein the RDGFPE manager may receive the authentication beacon transmitted by the base station, and the RDGFPE manager may authenticate the credential of the base station, and on authentication of the credential of the base station, perform remote attestation to the base station area.

Example 83 may be example 82, wherein the authentication beacon transmitted by the base station may include the a request for the credential of the UAV; wherein the RDGFP manager may transmit an authentication beacon that may include the credential of the base station, and a request for a credential of the UAV, and wherein to perform remote attestation, the UAV may provide the requested credential of the UAV to the base station.

Example 84 may be example 83, wherein the RDGFP manager may receive from the UAV the requested credential of the UAV; authenticate the received credential of the UAV; on authentication, determine whether the UAV may be authorized to collect any sensor data of the target within the geographic area; and on determination that the UAV is authorized to collect at least some, but not all, sensor data of the target within the geographic area, the RDGFP manager may further identify and provide instructions to the UAV to enforce the one or more reverse digital right management geo-fence policies; and wherein the RDGFPE manager may receive from the base station the instructions to enforce the one or more reverse digital right management geo-fence policies on operation of the second one or more sensors while the UAV operates over or near the geographic area; determine whether enforcement of the one or more reverse digital right management geo-fence policies on operation of the second one or more sensors while the UAV operates over or near the geographic area is acceptable; and enforce the one or more reverse digital right management geo-fence policies on operation of the second one or more sensors while the UAV operates over or near the geographic area, on determination that enforcement of the one or more reverse digital right management geo-fence policies on operation of the second one or more sensors while the UAV operates over or near the geographic area is acceptable.

Example 85 may be example 84, wherein the RDGFPE manager may cause cessation of operation of the second one or more sensors while the UAV operates over or near the geographic area or to cause the UAV to operate away from the geographic area, on determination that enforcement of the one or more reverse digital right management geo-fence policies on operation of the second one or more sensors while the UAV operates over or near the geographic area is unacceptable.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An unmanned aerial vehicle (UAV), comprising:
   first one or more sensors to provide first one or more sensor data for aerial operation of the UAV over or near a geographic area;
   second one or more sensors to collect second one or more sensor data of one or more targets within the geographic area; and
   a reverse digital right management geo-fence policy enforcement (RDGFPE) manager coupled with the first and second one or more sensors to enforce one or more reverse digital right management geo-fence policies associated with the geographic area, governing operation of the second one or more sensors while the UAV operates over or near the geographic area, after direct mutual authentication with a base station associated with and disposed within the geographic area, as the UAV approaches the geographic area;
   wherein the RDGFPE is to further confirm to the base station directly that the one or more reverse digital right management geo-fence policies governing operation of the second one or more sensors while the UAV operates over or near the geographic area, is being enforced on the UAV.

2. The UAV of claim 1, wherein to mutually authenticate with the base station directly, the RDGFPE manager is to directly receive an authentication beacon transmitted by the base station, wherein the authentication beacon includes a credential of the base station; wherein the RDGFPE manager is to authenticate the credential of the base station, and on authentication of the credential of the base station, directly perform remote attestation of the UAV to a base station area.

3. The UAV of claim 2, further comprising a secure storage to securely store a credential of the UAV, wherein the authentication beacon directly transmitted by the base station to the UAV includes a request for the credential of the UAV, and wherein to directly perform remote attestation of the UAV, the RDGFPE manager is to directly provide the credential of the UAV to the base station associated with the geographic area.

4. The UAV of claim 2, wherein the RDGFPE manager is to directly receive from the base station instructions to enforce the one or more reverse digital right management geo-fence policies governing operation of the second one or more sensors while the UAV operates over or near the geographic area; determine whether enforcement of the one or more reverse digital right management geo-fence policies governing operation of the second one or more sensors while the UAV operates over or near the geographic area is acceptable; and enforce the one or more reverse digital right management geo-fence policies governing operation of the second one or more sensors while the UAV operates over or near the geographic area, on determination that enforcement of the one or more reverse digital right management geo-fence policies governing operation of the second one or more sensors while the UAV operates over or near the geographic area is acceptable to the UAV.

5. The UAV of claim 2, wherein the second one or more sensors include at least a camera, and wherein the first one or more sensors include one or more of an accelerometer, a barometer, a gyroscope, a magnetometer, and an ambient light sensor.

6. The UAV of claim 4, wherein the RDGFPE manager is to further directly receive the one or more reverse digital right management geo-fence policies from the base station.

7. The UAV of claim 4, further comprising a secure storage to securely pre-store a plurality of reverse digital right management geo-fence policies including the one or more reverse digital right management geo-fence policies, and the RDGFPE manager is to directly receive one or more identifications of the one or more reverse digital right management geo-fence policies from the base station.

8. The UAV of claim 4, wherein the RDGFPE manager is to cause cessation of operation of the second one or more sensors while the UAV operates over or near the geographic area or to cause the UAV to operate away from the geographic area, on determination that enforcement of the one or more reverse digital right management geo-fence policies governing operation of the second one or more sensors while the UAV operates over or near the geographic area is unacceptable to the UAV.

9. The UAV of claim 1, wherein an authentication beacon directly transmitted by the base station to the UAV further includes location or perimeter information of the geographic area.

10. The UAV of claim 1, further comprising a trusted execution environment to host at least the RDGFPE manager.

11. A base station for enforcing one or more reverse digital right management geo-fence policies for a geographic area, comprising:
    a communication interface including a transmitter and an antenna; and
    a reverse digital right management geo-fence policy (RDGFP) manager coupled with the communication interface to directly instruct an unmanned aerial vehicle (UAV), via the communication interface, to enforce one or more reverse digital right management geo-fence policies governing operation of one or more sensors of the UAV on collecting sensor data of a target within the geographic area while the UAV operates over or near the geographic are;
    wherein the base station is associated with and disposed within the geographic area, and the base station is to mutually authenticate with the UAV directly, as the UAV approaches the geographic area; and
    wherein the base station is to monitor for direct confirmation from the UAV on the fact that the one or more reverse digital right management geo-fence policies governing operation of the one or more sensors of the UAV on collecting sensor data of a target within the geographic area while the UAV operates over or near the geographic area, is being enforced on the UAV.

12. The base station of claim 11, wherein the RDGFP manager is to directly transmit an authentication beacon to the UAV to request the UAV to directly perform remote attestation of the UAV with the base station, as the UAV comes within a pre-determined distance from the geographic area.

13. The base station of claim 12, wherein the RDGFP manager is to directly transmit an authentication beacon to the UAV that includes location or perimeter information of the geographic area.

14. The base station of claim 12, further comprising a secure storage to securely store a credential of the base station, wherein the RDGFP manager is to directly transmit an authentication beacon that includes the credential of the base station, and a request for a credential of the UAV, and wherein to directly perform remote attestation of the UAV, the UAV is to directly provide the requested credential of the UAV to the base station.

15. The base station of claim 14, wherein the RDGFP manager is to directly receive from the UAV the requested credential of the UAV; authenticate the received credential of the UAV; on authentication, determine whether the UAV is to be authorized to collect any sensor data of the target within the geographic area; and on determination that the UAV is authorized to collect at least some, but not all, sensor data of the target within the geographic area, the RDGFP manager is to further identify the one or more reverse digital right management geo-fence policies.

16. The base station of claim 15, wherein on identification of the one or more reverse digital right management geo-fence policies, the RDGFP manager is to directly inform the UAV of the one or more reverse digital right management geo-fence policies or directly provide the UAV of the one or more reverse digital right management geo-fence policies; and wherein the base station further comprises a transaction database to log the authorization of the UAV and identification or provision of the one or more reverse digital right management geo-fence policies to the UAV.

17. The base station of claim 11, wherein the RDGFP manager is to further determine whether the UAV is enforcing the one or more reverse digital right management geo-fence policies governing operation of the one or more sensors of the UAV while the UAV operates over or near the geographic area, and on determination that the UAV is not enforcing the one or more reverse digital right management geo-fence policies governing operation of the one or more sensors of the UAV while the UAV operates over or near the geographic area, revoke authorization of the UAV to collect any sensor data of the target within the geographic area; and
    wherein the base station is to further include a revocation database to log the revocation of the authorization of the UAV to collect any sensor data of the target within the geographic area.

18. The base station of claim 11, further comprising a geo-fencing manager to define the geographic area, and the RDGFP manager is to further share transactions with the UAV, including revocation of authorization, if any, with another base station associated with and disposed at another geographic area, responsible for enforcing reverse digit right management policies governing operation of UAV over the other geographic area.

19. The base station of claim 11, further comprising a trusted execution environment to host at least the RDGFP manager.

20. A system, comprising:
an unmanned aerial vehicle (UAV); and
a base station for enforcing one or more reverse digital right management geo-fence policies governing operation of the UAV for a geographic area, the base station being associated with and located within the geographic area;
wherein the base station comprises:
a communication interface including a transmitter and an antenna; and
a trusted execution environment (TEE) having at least a reverse digital right management geo-fence policy (RDGFP) manager coupled with the communication interface to directly instruct the UAV, via the communication interface, to enforce the one or more reverse digital right management geo-fence policies governing operation of one or more sensors of the UAV on collecting sensor data of a target within the geographic area while the UAV operates over or near the geographic area; and
wherein the UAV comprises:
first one or more sensors to provide first one or more sensor data for aerial operation of the UAV over or near a geographic area;
second one or more sensors to collect second one or more sensor data of one or more targets within the geographic area; and
a trusted execution environment (TEE) having at least a reverse digital right management geo-fence policy enforcement (RDGFPE) manager coupled with the first and second one or more sensors to enforce one or more reverse digital right management geo-fence policies governing operation of the second one or more sensors while the UAV operates over or near the geographic area, after direct mutual authentication with the base station associated with and disposed within the geographic area, as the UAV approaches the geographic area;
wherein the RDGFPE is to further confirm to the base station directly that the one or more reverse digital right management geo-fence policies governing operation of the second one or more sensors while the UAV operates over or near the geographic area, is being enforced on the UAV.

21. The system of claim 20,
wherein the RDGFP manager is to directly transmit an authentication beacon to the UAV to request the UAV to directly perform remote attestation with the base station, as the UAV comes within a pre-determined distance from the geographic area, wherein the base station further comprises a secure storage to securely store a credential of the base station, and the authentication beacon includes the credential of the base station; and
wherein the RDGFPE manager is to directly receive the authentication beacon transmitted by the base station, and the RDGFPE manager is to authenticate the credential of the base station, and on authentication of the credential of the base station, directly perform remote attestation of the UAV to the base station area.

22. The system of claim 21,
wherein the authentication beacon directly transmitted by the base station includes a request for a credential of the UAV; and
wherein the RDGFP manager is to directly transmit an authentication beacon that includes the credential of the base station, and the request for the credential of the UAV, and wherein to directly perform remote attestation of the UAV, the UAV is to directly provide the requested credential of the UAV to the base station.

23. The system of claim 22,
wherein the RDGFP manager is to directly receive from the UAV the requested credential of the UAV; authenticate the received credential of the UAV; on authentication, determine whether the UAV is to be authorized to collect any sensor data of the target within the geographic area; and on determination that the UAV is authorized to collect at least some, but not all, sensor data of the target within the geographic area, the RDGFP manager is to further identify and directly provide instructions to the UAV to enforce the one or more reverse digital right management geo-fence policies; and wherein the RDGFPE manager is to directly receive from the base station the instructions to enforce the one or more reverse digital right management geo-fence policies governing operation of the second one or more sensors while the UAV operates over or near the geographic area; determine whether enforcement of the one or more reverse digital right management geo-fence policies on operation of the second one or more sensors while the UAV operates over or near the geographic area is acceptable; and enforce the one or more reverse digital right management geo-fence policies governing operation of the second one or more sensors while the UAV operates over or near the geographic area, on determination that enforcement of the one or more reverse digital right management geo-fence policies governing operation of the second one or more sensors while the UAV operates over or near the geographic area is acceptable.

24. The system of claim 23, wherein the RDGFPE manager is to cause cessation of operation of the second one or more sensors while the UAV operates over or near the geographic area or to cause the UAV to operate away from the geographic area, on determination that enforcement of the one or more reverse digital right management geo-fence policies governing operation of the second one or more sensors while the UAV operates over or near the geographic area is unacceptable to the UAV.

* * * * *